United States Patent
Murakami

(10) Patent No.: US 11,137,963 B2
(45) Date of Patent: Oct. 5, 2021

(54) IMAGE FORMING APPARATUS AND COMPUTER-READABLE NON-TEMPORARY RECORDING MEDIUM THAT STORES IMAGE FORMING PROGRAM

(71) Applicant: KYOCERA Document Solutions Inc., Osaka (JP)

(72) Inventor: Takashi Murakami, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/082,190

(22) Filed: Oct. 28, 2020

(65) Prior Publication Data

US 2021/0132887 A1    May 6, 2021

(30) Foreign Application Priority Data

Oct. 31, 2019   (JP) .............................. JP2019-198263

(51) Int. Cl.
   *G06F 3/12*   (2006.01)

(52) U.S. Cl.
   CPC .......... *G06F 3/1263* (2013.01); *G06F 3/1296* (2013.01)

(58) Field of Classification Search
   CPC .... G06F 3/1263; G06F 3/1296; G06F 3/1205; G06F 3/1262
   See application file for complete search history.

(56) References Cited

U.S. PATENT DOCUMENTS 5,970,224 A * 10/1999 Salgado ............. H04N 1/00915
                                                      358/1.14

FOREIGN PATENT DOCUMENTS

| JP | H10-289074 | 10/1998 |
| JP | H10-320156 | 12/1998 |

* cited by examiner

*Primary Examiner* — Iriana Cruz
(74) *Attorney, Agent, or Firm* — Lex IP Meister, PLLC

(57) ABSTRACT

An image forming apparatus for accepting print jobs, determining the execution order of received jobs, and executing the jobs in the determined order manages an unspecified job priority as the execution priority of an unspecified job for which a value that affects the order of execution is not specified. The image forming apparatus can accept a priority-specified job for which an execution priority is specified and an unspecified job. The image forming apparatus determines the order of execution of this priority-specified job on the basis of the priority specified in the priority-specified job, and determines the order of execution of the unspecified job on the basis of the unspecified job priority, and can accept a specification of the unspecified job priority.

3 Claims, 12 Drawing Sheets

JOB LIST 25c

| JOB ID | FIRST PRIORITY | SECOND PRIORITY |
|---|---|---|
| 1 | 0 | 1 |
| 2 | 0 | 2 |
| 3 | 0 | 3 |
| 4 | 10 | 1 |
| . | . | . |
| . | . | . |
| . | . | . |

FIG. 9A

| JOB ID | FIRST PRIORITY | SECOND PRIORITY | PRINTING ORDER |
|---|---|---|---|
| 1 | 0 | 1 | 1 |
| 2 | 0 | 2 | 2 |
| 3 | 0 | 3 | 3 |

FIG. 9B

| JOB ID | FIRST PRIORITY | SECOND PRIORITY | PRINTING ORDER |
|---|---|---|---|
| 4 | 10 | 1 | 1 |
| 1 | 0 | 1 | 2 |
| 2 | 0 | 2 | 3 |
| 3 | 0 | 3 | 4 |

FIG. 9C

| JOB ID | FIRST PRIORITY | SECOND PRIORITY | PRINTING ORDER |
|---|---|---|---|
| 4 | 10 | 1 | 1 |
| 5 | 5 | 1 | 2 |
| 1 | 0 | 1 | 3 |
| 2 | 0 | 2 | 4 |
| 3 | 0 | 3 | 5 |

FIG. 10A

| JOB ID | FIRST PRIORITY | SECOND PRIORITY | PRINTING ORDER |
|---|---|---|---|
| 4 | 10 | 1 | 1 |
| 6 | 10 | 2 | 2 |
| 5 | 5 | 1 | 3 |
| 1 | 0 | 1 | 4 |
| 2 | 0 | 2 | 5 |
| 3 | 0 | 3 | 6 |

FIG. 10B

| JOB ID | FIRST PRIORITY | SECOND PRIORITY | PRINTING ORDER |
|---|---|---|---|
| 4 | 10 | 1 | 1 |
| 6 | 10 | 2 | 2 |
| 5 | 5 | 1 | 3 |
| 7 | 5 | 2 | 4 |
| 1 | 0 | 1 | 5 |
| 2 | 0 | 2 | 6 |
| 3 | 0 | 3 | 7 |

FIG. 10C

| JOB ID | FIRST PRIORITY | SECOND PRIORITY | PRINTING ORDER |
|---|---|---|---|
| 4 | 10 | 1 | 1 |
| 6 | 10 | 2 | 2 |
| 8 | 5 | 1 | 3 |
| 5 | 5 | 2 | 4 |
| 7 | 5 | 3 | 5 |
| 1 | 0 | 1 | 6 |
| 2 | 0 | 2 | 7 |
| 3 | 0 | 3 | 8 |

FIG. 11A

| JOB ID | FIRST PRIORITY | SECOND PRIORITY | PRINTING ORDER |
|---|---|---|---|
| 1 | 50 | 1 | 1 |
| 2 | 50 | 2 | 2 |
| 3 | 50 | 3 | 3 |

FIG. 11B

| JOB ID | FIRST PRIORITY | SECOND PRIORITY | PRINTING ORDER |
|---|---|---|---|
| 1 | 50 | 1 | 1 |
| 2 | 50 | 2 | 2 |
| 3 | 50 | 3 | 3 |
| 4 | 10 | 1 | 4 |

IMAGE FORMING APPARATUS AND COMPUTER-READABLE NON-TEMPORARY RECORDING MEDIUM THAT STORES IMAGE FORMING PROGRAM

INCORPORATION BY REFERENCE

This application is based upon, and claims the benefit of priority from, corresponding Japanese Patent Application No. 2019-198263 filed in the Japan Patent Office on Oct. 31, 2019, the entire contents of which are incorporated herein by reference.

BACKGROUND

Field of the Invention

The present disclosure relates to an image forming apparatus that executes a print job and a computer-readable non-temporary recording medium that stores an image forming program.

Description of Related Art

Conventionally, an image forming apparatus that executes a print job in order of priority has been known. However, in the conventional image forming apparatus, there is a problem that it is unclear how the image forming apparatus behaves when a job for which an execution priority is specified and a job for which an execution priority is not specified are mixed.

SUMMARY

An image forming apparatus of the present disclosure includes a job acceptor configured to accept a print job, an order determiner configured to determine an order of execution of the job accepted by the job acceptor, a job executor configured to execute the job accepted by the job acceptor in the order determined by the order determiner, and an unspecified job priority manager configured to manage an unspecified job priority as an execution priority of an unspecified job as the job for which a value that affects the order is not specified. The job acceptor can accept a priority-specified job as the job for which an execution priority is specified as the value and an unspecified job. The order determiner determines the order of this priority-specified job on a basis of the priority specified in the priority-specified job, and determines the order of the unspecified job on a basis of the unspecified job priority managed by the unspecified job priority manager. The unspecified job priority manager can accept a specification of the unspecified job priority.

In the image forming apparatus of the present disclosure, the job acceptor can accept an adjacent job-specified job as the job specified as the value for which at least one of an existing job to be executed immediately before and an existing job to be executed immediately after, and the order determiner may determine the order of this adjacent job-specified job on a basis of the order of the existing job specified in the adjacent job-specified job.

A computer-readable non-temporary recording medium of the present disclosure stores an image forming program, and the image forming program causes an image forming apparatus to implement a job acceptor configured to accept a print job, an order determiner configured to determine an order of execution of the job accepted by the job acceptor, a job executor configured to execute the job accepted by the job acceptor in the order determined by the order determiner, and an unspecified job priority manager configured to manage an unspecified job priority as an execution priority of an unspecified job as the job for which a value that affects the order is not specified. The job acceptor can accept a priority-specified job as the job for which an execution priority is specified as the value and an unspecified job. The order determiner determines the order of this priority-specified job on a basis of the priority specified in the priority-specified job, and determines the order of the unspecified job on a basis of the unspecified job priority managed by the unspecified job priority manager. The unspecified job priority manager can accept a specification of the unspecified job priority.

BRIEF DESCRIPTION OF THE DRAWINGS

FIG. 9A is a table illustrating an example of the jobs included in a job list in a case where the unspecified job priority is 0;

FIG. 9B is a table illustrating an example of the jobs included in the job list in a case where a new job is added in the state illustrated in FIG. 9A;

FIG. 9C is a table illustrating an example of the jobs included in the job list in a case where a new job is added in the state illustrated in FIG. 9B;

FIG. 10A is a table illustrating an example of the jobs included in the job list in a case where a new job is added in the state illustrated in FIG. 9C;

FIG. 10B is a table illustrating an example of the jobs included in the job list in a case where a new job is added in the state illustrated in FIG. 10A;

FIG. 10C is a table illustrating an example of the jobs included in the job list in a case where a new job is added in the state illustrated in FIG. 10B;

FIG. 11A is a table illustrating an example of the jobs included in a job list in a case where the unspecified job priority is 50;

FIG. 11B is a table illustrating an example of the jobs included in the job list in a case where a new job is added in the state illustrated in FIG. 11A.

DETAILED DESCRIPTION

The following describes an embodiment of the present disclosure with the use of the accompanying drawings.

First of all, a description will be made as to a configuration of an image forming system according to an embodiment of the present disclosure.

Figure 1:
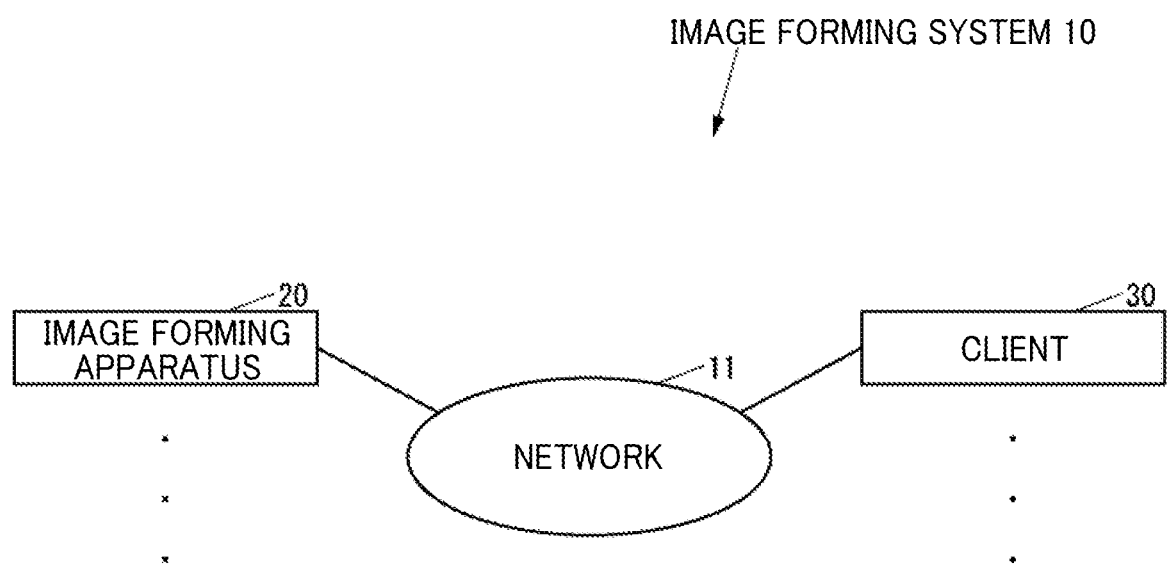
FIG. 1 is a block diagram of an image forming system according to an embodiment of the present disclosure.

FIG. 1 is a block diagram of an image forming system 10 according to the present embodiment.

As illustrated in FIG. 1, the image forming system 10 includes an image forming apparatus 20 such as a production printer. The image forming system 10 can include at least one image forming apparatus similar to the image forming apparatus 20 in addition to the image forming apparatus 20. The image forming apparatus in the image forming system 10 can be identified by a device ID as the identification information of the image forming apparatus.

The image forming apparatus can accept a specified job as a print job for which a value that affects the order of execution is specified and an unspecified job as a print job for which a value that affects the order of execution is not specified. As a specified job, there is a priority-specified job as a job for which the execution priority is specified as a value that affects the order of execution. In addition, as the specified job, there is an adjacent job-specified job as a job for which at least one of an existing job to be executed immediately before the adjacent job-specified job and an existing job to be executed immediately after the adjacent job-specified job is specified as a value that affects the order of execution.

In a production printer market, there may be a case to use an application provided with a workflow function, such as a JDF (Job Definition Format) compatible MIS (Management Information System), in which all data from estimation to receipt of order, accounts receivable, placement of order, accounts payable, inventory, initial cost, printing process, and management is centrally managed to shorten paperwork time and reduce labor. Here, depending on a user's environment, a plurality of image forming apparatuses by different manufacturers may be used. Therefore, an application provided with a workflow function needs to instruct each of a plurality of image forming apparatuses and manage the state of each of the plurality of image forming apparatuses. As the interface of the application, the international standardization organization CIP4 (Cooperation for Integration of Processes in Prepress, Press, and Postpress) defines a common format called XJDF (Exchange Job Definition Format) and XJMF (Exchange Job Messaging Format).

The image forming system 10 includes a client 30 as a computer that transmits a print instruction to an image forming apparatus by an XJMF message. The image forming system 10 can include at least one client similar to the client 30 in addition to the client 30.

The image forming apparatus in the image forming system 10 and the client in the image forming system 10 can communicate with each other via a network 11 such as a LAN (Local Area Network) or the Internet.

Figure 2:
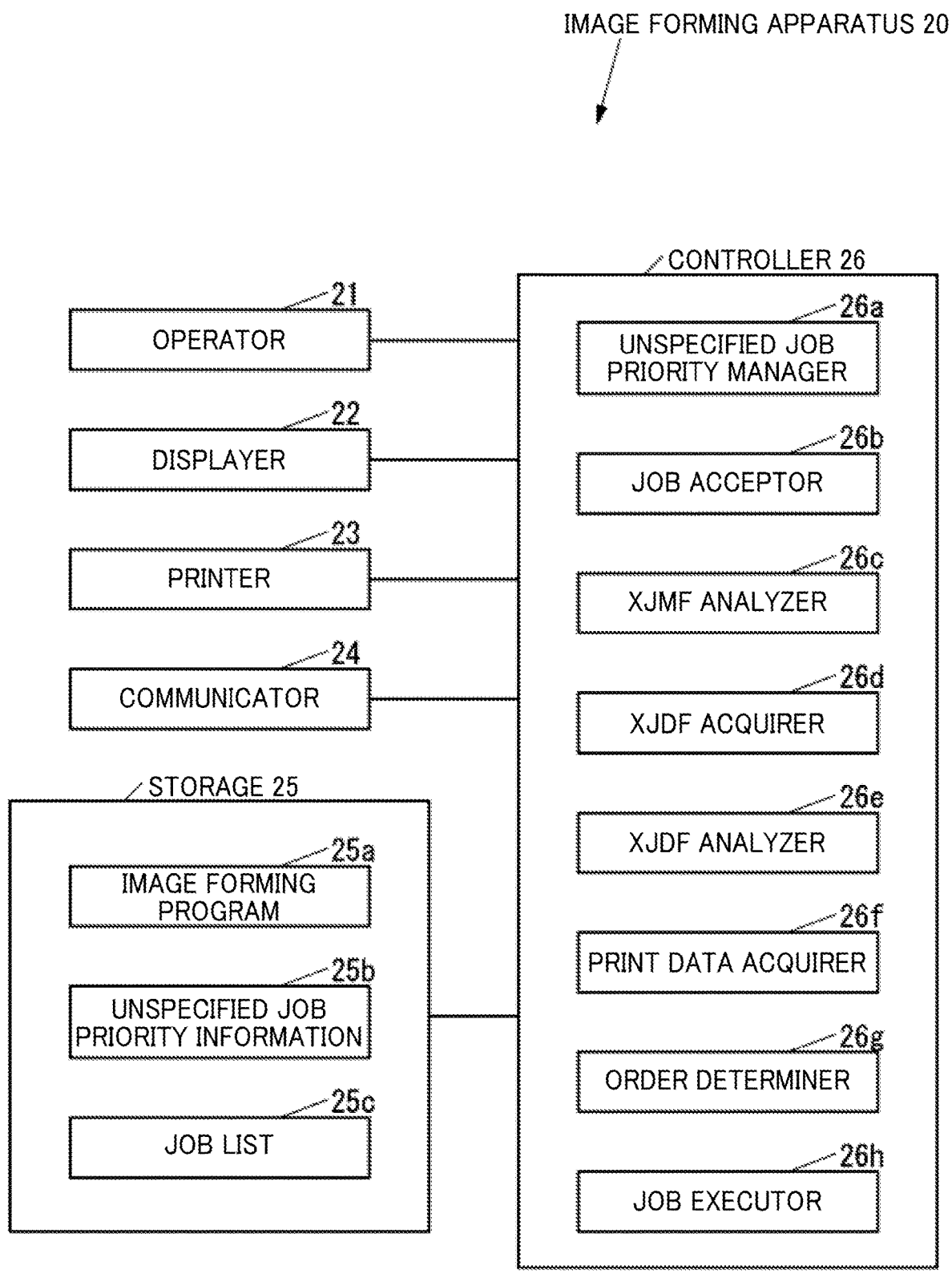
FIG. 2 is a block diagram of an image forming apparatus illustrated in FIG. 1.

FIG. 2 is a block diagram of an image forming apparatus 20.

As illustrated in FIG. 2, the image forming apparatus 20 includes an operator 21 which is an operation device such as a button with which various operations are input, and a displayer 22 which is a display device such as an LCD (Liquid Crystal Display) that displays various information, a printer 23 which is a printing device that prints an image on a recording medium such as a paper, a communicator 24 which is a communication device that communicates with external apparatuses directly via a network such as a LAN or the Internet, or directly by wire or wirelessly without going through the network, a storage 25 which is a non-volatile storage device such as a semiconductor memory or an HDD (Hard Disk Drive) that stores various types of information, and a controller 26 that controls the entire image forming apparatus 20.

The storage 25 stores an image forming program 25a. For example, the image forming program 25a may be installed in the image forming apparatus 20 at the manufacturing stage of the image forming apparatus 20, or may be additionally installed in the image forming apparatus 20 from an external storage medium such as a USB (Universal Serial Bus) memory, or may be additionally installed in the image forming apparatus 20 from the network.

The storage 25 stores unspecified job priority information 25b indicating, for each print instruction program described later, an unspecified job priority as the execution priority of an unspecified job. The unspecified job priority is represented by an integer from 0 to 100, which is 0 by default.

The storage 25 stores a job list 25c for managing a job.

Figure 3:
FIG. 3 is a table illustrating an example of a job list illustrated in FIG. 2.

FIG. 3 is a table illustrating an example of the job list 25c.

As illustrated in FIG. 3, a job list 25c indicates, for each job, a job ID as the identification information of a job, a first priority as the execution priority of the job, and a second priority as the execution priority of jobs with a same first priority. The first priority is represented by an integer from 0 to 100, and the larger the number, the higher the priority. That is, the first priority is 0 for the lowest and 100 for the highest. The second priority is represented by a positive integer, and the smaller the number, the higher the priority. That is, the second priority is 1 for the highest.

The controller 26 illustrated in FIG. 2 includes, for example, a CPU (Central Processing Unit), a ROM (Read Only Memory) that stores a program and various data, and a RAM (Random Access Memory) as a memory used as a work area of the CPU of the controller 26. The CPU of the controller 26 executes the program stored in the ROM of the storage 25 or the controller 26.

The controller 26 executes the image forming program 25a, and thereby implements an unspecified job priority manager 26a that manages the unspecified job priority, a job acceptor 26b that accepts a print job, an XJMF analyzer 26c that analyzes the XJMF message of a job accepted by the job acceptor 26b, an XJDF acquirer 26d that acquires an XJDF on the basis of the result of the analysis by the XJMF analyzer 26c, an XJDF analyzer 26e that analyzes the XJDF acquired by the XJDF acquirer 26d, a print data acquirer 26f that acquires print data on the basis of the result of the analysis by the XJDF analyzer 26e, an order determiner 26g that determines the order of execution of the job accepted by the job acceptor 26b, and a job executor 26h that executes the job accepted by the job acceptor 26b in the order determined by the order determiner 26g.

Figure 4:
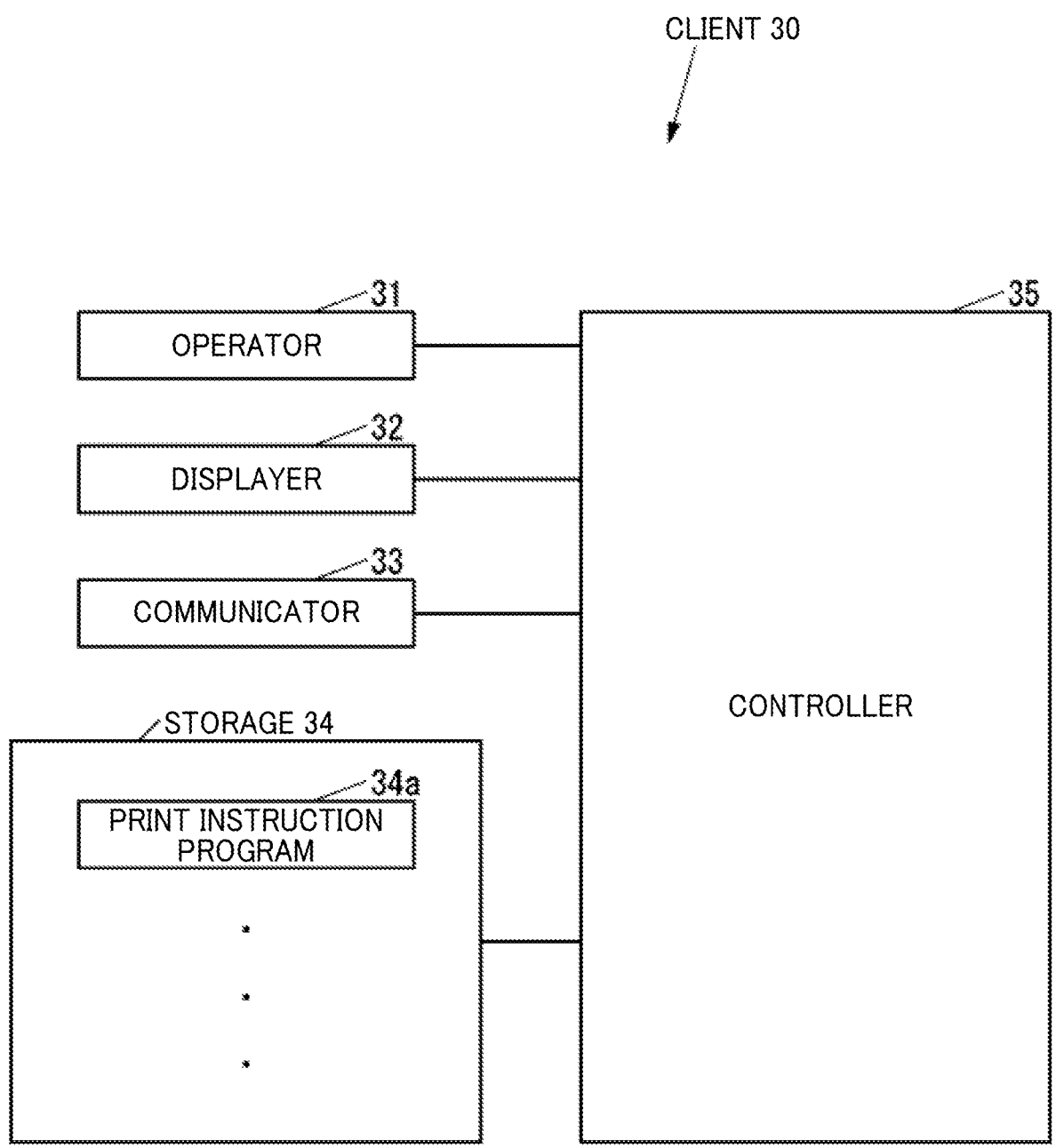
FIG. 4 is a block diagram of a client illustrated in FIG. 1.

FIG. 4 is a block diagram of the client 30.

As illustrated in FIG. 4, the client 30 includes an operator 31 which is an operation device for inputting various operations, such as a keyboard and a mouse, a displayer 32 which is a display device such as an LCD that displays various information, a communicator 33 which is a communication device that communicates with external apparatuses directly via a network such as a LAN or the Internet, or directly by wire or wirelessly without going through the network, a storage 34 which is a non-volatile storage device such as a semiconductor memory or an HDD that stores various types of information, and a controller 35 that controls the entire client 30.

The storage 34 stores a print instruction program 34a which is an application program for transmitting a print instruction to the image forming apparatus. The print instruction program 34a may be installed, for example, in the client 30 at the manufacturing stage of the client 30, or may be additionally installed to the client 30 from an external storage medium such as a CD (Compact Disk), a DVD (Digital Versatile Disk), or a USB memory, or may be additionally installed to the client 30 from the network. The print instruction program 34a is, for example, a JDF-compatible MIS.

The storage 34 can store at least one print instruction program similar to the print instruction program 34a in addition to the print instruction program 34a.

The controller 35 includes, for example, a CPU, a ROM that stores a program and various data, and a RAM as a memory used as a work area of the CPU of the controller 35. The CPU of the controller 35 executes the program stored in the ROM of the storage 34 or the controller 35.

Next, the operation of the image forming system 10 will be described.

First, the operation of the image forming apparatus 20 in a case where an unspecified job priority is set will be described.

Figure 5:
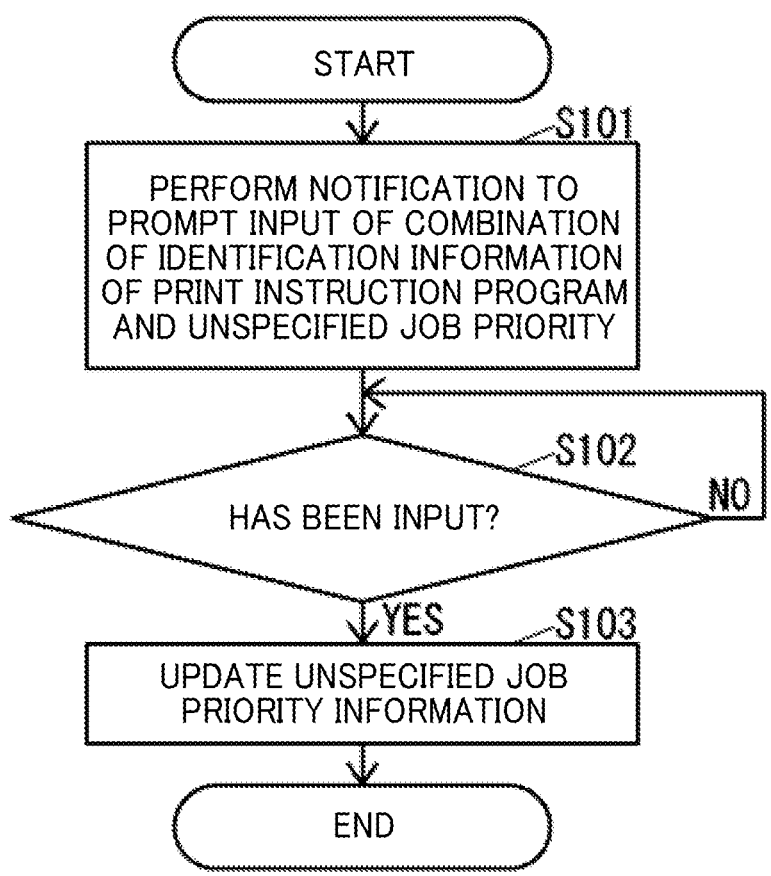
FIG. 5 is a flowchart of the operation of the image forming apparatus illustrated in FIG. 2 when setting an unspecified job priority.

FIG. 5 is a flowchart of the operation of the image forming apparatus 20 when setting an unspecified job priority.

The controller 26 of the image forming apparatus 20 executes the operation illustrated in FIG. 5 when an instruction to start the process of setting an unspecified job priority is input via the operator 21 or the communicator 24.

As illustrated in FIG. 5, the unspecified job priority manager 26a performs a notification to prompt a user to input combination of identification information of a print instruction program that the user wants to set an unspecified job priority and an unspecified job priority that the user wants to set for this print instruction program (S101). When an instruction to start the process of setting the unspecified job priority is input via the operator 21, the unspecified job priority manager 26a performs the notification in S101 by the display on the displayer 22, and when an instruction to start the process of setting the unspecified job priority is input via the communicator 24, the unspecified job priority manager 26a performs the notification in S101 via the communicator 24.

Next, the unspecified job priority manager 26a determines whether the combination of the identification information of a print instruction program and an unspecified job priority is input via the operator 21 or the communicator 24 until determining that the combination of the identification information of a print instruction program and un unspecified job priority is input (S102).

When determining in S102 that the combination of the identification information of a print instruction program and an unspecified job priority has been input, the unspecified job priority manager 26a updates the unspecified job priority information 25b so as to change the unspecified job priority in the unspecified job priority information 25b associated with the print instruction program identified by the identification information of the combination input via the operator 21 or the communicator 24, to the unspecified job priority of the combination input via the operator 21 or the communicator 24 (S103), and ends the operation illustrated in FIG. 5.

Next, the operation of the client 30 when transmitting a print instruction will be described.

Figure 6:
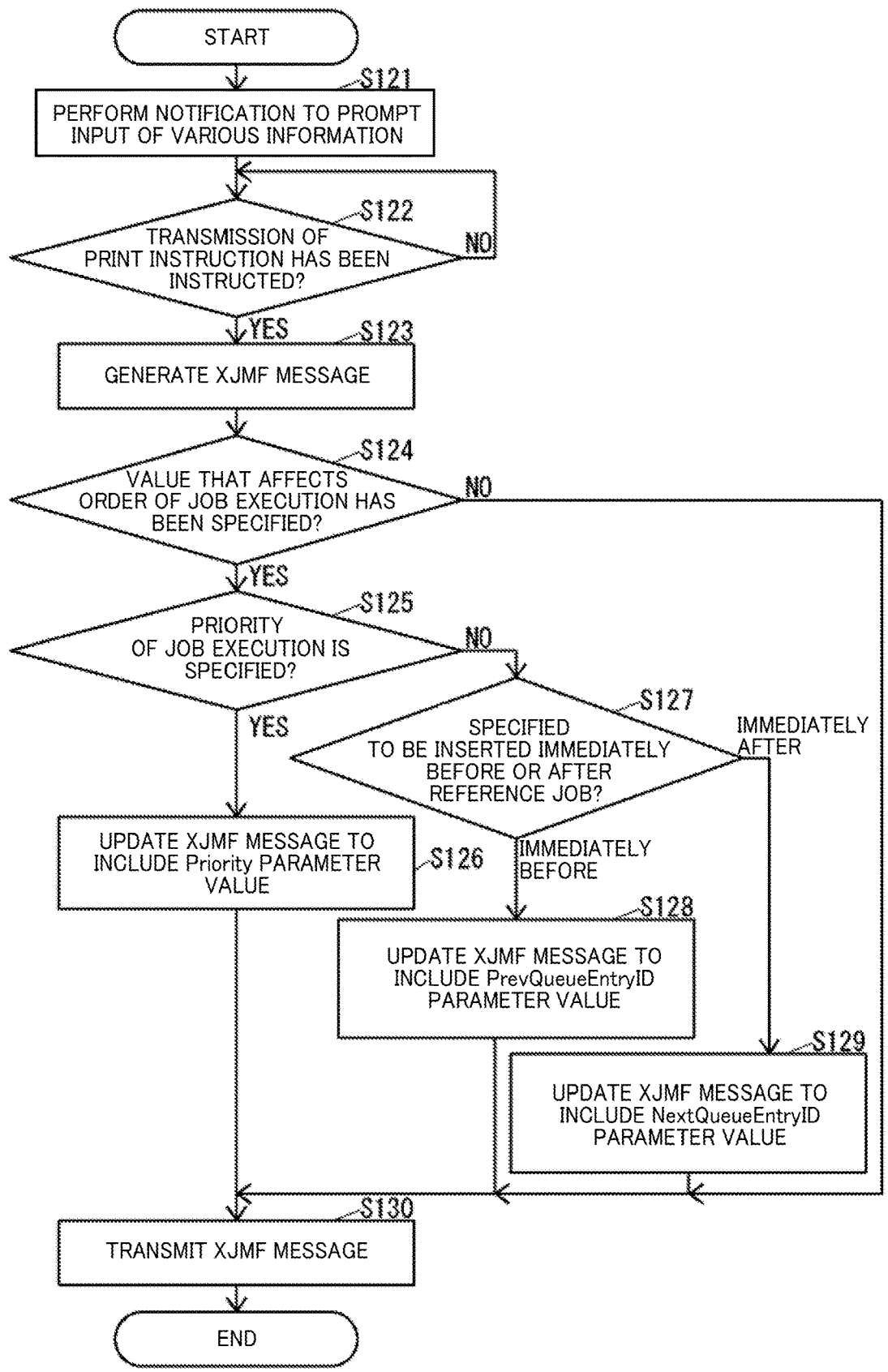
FIG. 6 is a flowchart of the operation of a client illustrated in FIG. 4 when transmitting a print instruction.

FIG. 6 is a flowchart of the operation of the client 30 when transmitting a print instruction.

When instructed to execute one of the print instruction programs stored in the storage 34 via the operator 31, the controller 35 of the client 30 executes the operation illustrated in FIG. 6 by executing this print instruction program.

As illustrated in FIG. 6, the controller 35 performs a notification to prompt the user to input various information such as the device ID of the image forming apparatus to which the print instruction is transmitted and the URL (Uniform Resource Locator) of the XJDF, by the display on the displayer 32 (S121).

Here, various information can include the specification of a value that affects the order of job execution identified by the print instruction. In the controller 35, a value that affects the order of job execution can be specified by one of the following two methods.

The first method to specify a value that affects the order of job execution is to specify the execution priority of the job. This priority is represented by an integer from 0 to 100, and the larger the number, the higher the priority. That is, this priority is 0 for the lowest and 100 for the highest.

The second method to specify a value that affects the order of job execution is to specify an existing job that is executed immediately before the job or an existing job that is executed immediately after the job. In the controller 35, a job ID of a job that serves as the reference for the position where a new job is inserted (hereinafter referred to as a "reference job"), of the preceding jobs, and a job immediately before or after the reference job, to which a new job is inserted, are specified. As the job ID of the reference job, for example, the one transmitted from the image forming apparatus in the operations illustrated in FIGS. 7 and 8 described later is used.

After the processing of S121, the controller 35 determines whether the transmission of the print instruction is instructed via the operator 31 until determining that the transmission of the print instruction is instructed (S122). The controller 35 can also be instructed to transmit the print instruction via the operator 31 without a specification of a value that affects the order of job execution.

When determining in S122 that the transmission of the print instruction has been instructed, the controller 35 generates an XJMF message including the identification information of the print instruction program being executed this time and the URL of the XJDF input via the operator 31 (S123).

Next, the controller 35 determines whether a value that affects the order of job execution has been specified (S124).

When determining in S124 that a value that affects the order of job execution has been specified, the controller 35 determines whether the execution priority of the job is specified (S125).

When determining in S125 that the execution priority of the job is specified, the controller 35 updates the XJMF message generated in S123 to include that the value of the specified priority as the value of a parameter called Priority (S126).

When determining in S125 that the execution priority of the job is not specified, the controller 35 determines whether a new job is specified to be inserted immediately before or after the reference job (S127).

When determining in S127 that a new job is specified to be inserted immediately before the reference job, the controller 35 updates the XJMF message generated in S123 to include the job ID of the reference job instructed via the operator 31 as the value of a parameter called PrevQueueEntryID (S128).

When determining in S127 that a new job is specified to be inserted immediately after the reference job, the controller 35 update the XJMF message generated in S123 to include the job ID of the reference job instructed via the operator 31 as the value of a parameter called NextQueueEntryID (S129).

When determining in S124 that a value that affects the order of job execution has not been specified, or when the processing of S126, S128 or S129 ends, the controller 35 transmits the current XJMF message to the image forming apparatus identified by the device ID input via the operator 31 (S130), and ends the operation illustrated in FIG. 6.

Next, the operation of the image forming apparatus 20 when receiving a print instruction will be described.

Figure 7:
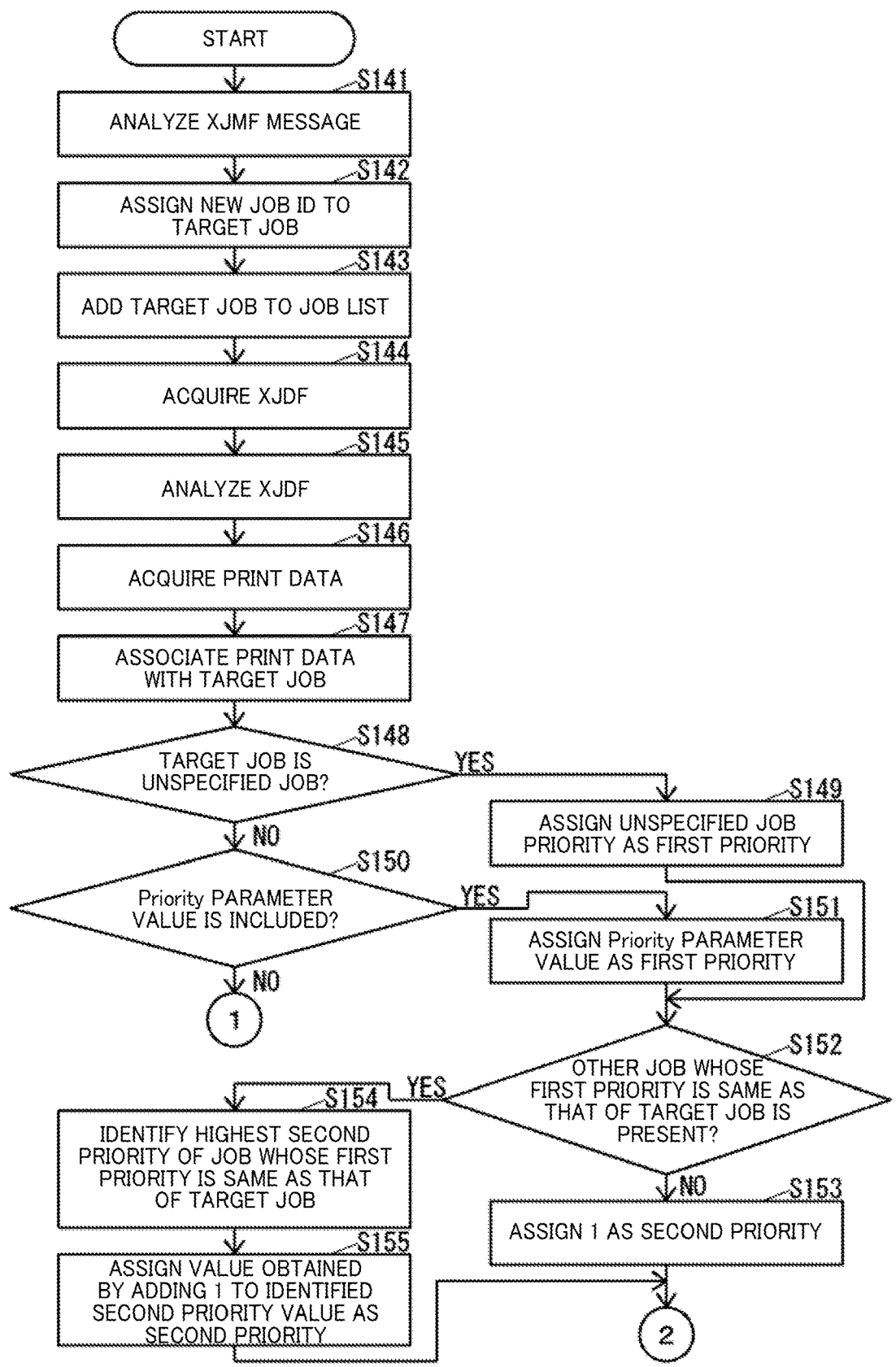
FIG. 7 is a partial flowchart of the operation of the image forming apparatus illustrated in FIG. 2 when receiving a print instruction.
Figure 8:
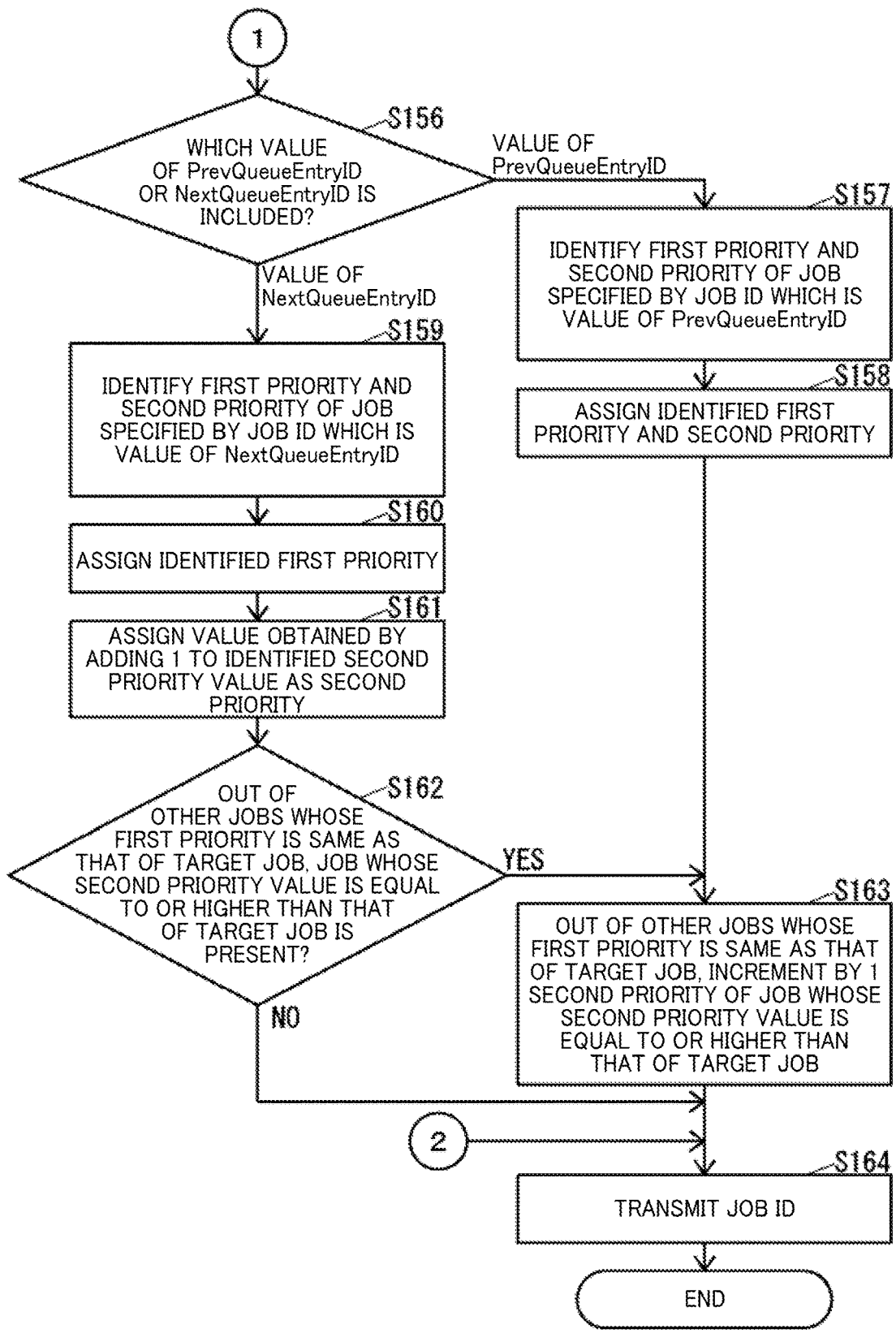
FIG. 8 is a continuation of the flowchart illustrated in FIG. 7.

FIG. 7 is a partial flowchart of the operation of the image forming apparatus 20 when receiving a print instruction. FIG. 8 is a continuation of the flowchart illustrated in FIG. 7.

The job acceptor 26b of the image forming apparatus 20 receives a print instruction to thereby accept a job corresponding to the received instruction. When receiving the print instruction, the controller 26 of the image forming apparatus 20 executes the operations illustrated in FIGS. 7 and 8.

As illustrated in FIGS. 7 and 8, the XJMF analyzer 26c analyzes the XJMF message of the job corresponding to the received instruction (hereinafter referred to as a "target job" in the description of the operations illustrated in FIGS. 7 and 8) (S141). Here, the XJMF analyzer 26c identifies the URL of the XJDF included in the XJMF message of the target job.

After the processing of S141, the job acceptor 26b assigns a new job ID that has not yet been assigned to any job to the target job (S142), and adds the target job to the job list 25c (S143).

After the processing of S143, the XJDF acquirer 26d acquires the XJDF from the URL identified in S141 (S144). Here, the XJDF acquired in S144 includes the URL of print data such as a PDF (Portable Document Format) file.

After the processing of S144, the XJDF analyzer 26e analyzes the XJDF acquired in S144 (S145). Here, the XJDF analyzer 26e identifies the URL of the print data included in the XJDF acquired in S144.

After the processing of S145, the print data acquirer 26f acquires the print data from the URL identified in S145 (S146).

After the processing of S146, the print data acquirer 26f associates the print data acquired in S146 with the target job (S147).

Next, the order determiner 26g determines whether the target job is an unspecified job (S148). Here, if the XJMF message of the target job does not include the values of any of the parameters of Priority, PrevQueueEntryID, and NextQueueEntryID, the order determiner 26g determines that the target job is an unspecified job. On the other hand, if the XJMF message of the target job includes the values of any of the parameters of Priority, PrevQueueEntryID and NextQueueEntryID, the order determiner 26g determines that the target job is not an unspecified job.

When determining in S148 that the target job is an unspecified job, the order determiner 26g assigns, to the target job as the first priority, an unspecified job priority indicated in the unspecified job priority information 25b for the print instruction program identified by the identification information included in the XJMF message of the target job (S149).

When determining in S148 that the target job is not an unspecified job, the order determiner 26g determines whether a Priority parameter value is included in the XJMF message of the target job (S150).

When determining in S150 that a Priority parameter value is included in the XJMF message of the target job, the order determiner 26g assigns this value to the target job as the first priority (S151).

After the processing S149 or S151, the order determiner 26g determines whether a job whose first priority is same as that of the target job is present in the job list 25c other than the target job (S152).

When determining in S152 that a job whose first priority is same as that of the target job is not present in the job list 25c other than the target job, the order determiner 26g assigns 1 to the target job as the second priority (S153).

When determining in S152 that a job whose first priority is same as that of the target job is present in the job list 25c other than the target job, the order determiner 26g identifies the highest second priority of a job which is present in the job list 25c and the first priority of which is same as that of the target job (S154), and assigns the value obtained by adding 1 to the second priority value identified in S154 to the target job as the second priority (S155).

When determining in the S150 that a Priority parameter value is not included in the XJMF message of the target job, the order determiner 26g determines which value of the PrevQueueEntryID parameter and the NextQueueEntryID parameter is included in the XJMF message of the target job (S156).

When determining in S156 that a PrevQueueEntryID parameter value is included in the XJMF message of the target job, the order determiner 26g identifies the first priority and second priority indicated in the job list 25c for a job identified by a job ID which is the value of the PrevQueueEntryID (S157), and assigns the first priority and second priority same as the first priority and second priority identified in S157 to the target job (S158).

When determining in S156 that a NextQueueEntryID parameter value is included in the XJMF message of the target job, the order determiner 26g identifies the first priority and second priority indicated in the job list 25c for a job identified by a job ID which is the value of the NextQueueEntryID (S159), assigns the value identified in S159 to the target job as the first priority (S160), and assigns the value obtained by adding 1 to the second priority value identified in S159 to the target job as the second priority (S161).

Next, the order determiner 26g determines whether a job whose second priority value is equal to or higher than that of the target job is present, out of jobs other than the target job, which are present in the job list 25c and the first priority of which is same as that of the target job (S162).

When the processing of S158 ends or when determining in S162 that a job whose second priority value is equal to or higher than that of the target job is present, out of jobs other than the target job, which are present in the job list 25c and the first priority of which is same as that of the target job, the order determiner 26g increments by 1 the second priority of a job whose second priority value is equal to or higher than that of the target job, out of jobs other than the target job, which are present in the job list 25c and the first priority of which is same as that of the target job (S163).

When the processing of S153 or S155 ends, or when determining in S162 that a job whose second priority value is equal to or higher than that of the target job is not present, out of jobs other than the target job, which are present in the job list 25c and the first priority of which is same as that of the target job, or when the processing of S163 ends, the job acceptor 26b transmits the job ID assigned in S142 to the transmission source of the print instruction (S164), and ends the operations illustrated in FIGS. 7 and 8.

The following is an example of changes in the jobs included in the job list 25c.

FIG. 9A is a table illustrating an example of the jobs included in the job list 25c in a case where the unspecified job priority is 0. FIG. 9B is a table illustrating an example of the jobs included in the job list 25c in a case where a new job is added in the state illustrated in FIG. 9A. FIG. 9C is a table illustrating an example of the jobs included in the job list 25c in a case where a new job is added in the state illustrated in FIG. 9B. FIG. 10A is a table illustrating an example of the jobs included in the job list 25c in a case where a new job is added in the state illustrated in FIG. 9C. FIG. 10B is a table illustrating an example of the jobs included in the job list 25c in a case where a new job is added in the state illustrated in FIG. 10A. FIG. 10C is a table illustrating an example of the jobs included in the job list 25c in a case where a new job is added in the state illustrated in FIG. 10B.

The job list 25c does not include the information "printing order" illustrated in FIGS. 9 and 10. In FIGS. 9 and 10, the "printing order" is illustrated for ease of understanding.

In a case where the unspecified job priority is 0 and a job is not included in the job list 25c, when receiving a print instruction corresponding to an unspecified job, the controller 26 of the image forming apparatus 20 assigns, for example, 1 as a job ID to a target job corresponding to the received instruction (S142), and after adding the target job to the job list 25c (S143), assigns 0, which is the unspecified job priority, to the target job as the first priority (S149), and assigns 1 to the target job as the second priority (S153). Next, when receiving a print instruction corresponding to an unspecified job, the controller 26 assigns, for example, 2 as a job ID to a target job corresponding to the received instruction (S142), and after adding the target job to the job list 25c (S143), assigns 0, which is the unspecified job priority, to the target job as the first priority (S149), and assigns 2 to the target job as the second priority (S155). Next, when receiving a print instruction corresponding to an unspecified job, the controller 26 assigns, for example, 3 as a job ID to a target job corresponding to the received instruction (S142), and after adding the target job to the job list 25c (S143), assigns 0, which is the unspecified job priority, to the target job as the first priority (S149), and assigns 3 to the target job as the second priority (S155). At the end of the above operation, the jobs included in the job list 25c are in the state illustrated in FIG. 9A.

In a case where the jobs included in the job list 25c are in the state illustrated in FIG. 9A, when receiving a print instruction in the XJMF message in which 10 is included as the Priority parameter value, the controller 26 assigns, for example, 4 as a job ID to a target job corresponding to the received instruction (S142), and after adding the target job to the job list 25c (S143), assigns the Priority parameter value 10 to the target job as the first priority (S151), and assigns 1 to the target job as the second priority (S153). At the end of the above operation, the jobs included in the job list 25c are in the state illustrated in FIG. 9B.

In a case where the jobs included in the job list 25c are in the state illustrated in FIG. 9B, when receiving a print instruction in the XJMF message in which 5 is included as the Priority parameter value, the controller 26 assigns, for example, 5 as a job ID to a target job corresponding to the received instruction (S142), and after adding the target job to the job list 25c (S143), assigns the Priority parameter value 5 to the target job as the first priority (S151), and assigns 1 to the target job as the second priority (S153). At the end of the above operation, the jobs included in the job list 25c are in the state illustrated in FIG. 9C.

In a case where the jobs included in the job list 25c are in the state illustrated in FIG. 9C, when receiving a print instruction in the XJMF message in which 10 is included as the Priority parameter value, the controller 26 assigns, for example, 6 as a job ID to a target job corresponding to the received instruction (S142), and after adding the target job to the job list 25c (S143), assigns the Priority parameter value 10 to the target job as the first priority (S151), and assigns 2 to the target job as the second priority (S155). At the end of the above operation, the jobs included in the job list 25c are in the state illustrated in FIG. 10A.

In a case where the jobs included in the job list 25c are in the state illustrated in FIG. 10A, when receiving a print instruction in the XJMF message in which 5 is included as the NextQueueEntryID parameter value, the controller 26 assigns, for example, 7 as a job ID to a target job corresponding to the received instruction (S142), and after adding the target job to the job list 25c (S143), assigns 5 which is the first priority of a job whose job ID is 5 to the target job as the first priority (S160), and assigns 2 to the target job as the second priority (S161). At the end of the above operation, the jobs included in the job list 25c are in the state illustrated in FIG. 10B.

In a case where the jobs included in the job list 25c are in the state illustrated in FIG. 10B, when receiving a print instruction in the XJMF message in which 5 is included as the PrevQueueEntryID parameter value, the controller 26 assigns, for example, 8 as a job ID to a target job corresponding to the received instruction (S142), and after adding the target job to the job list 25c (S143), assigns, 5 which is the first priority and 1 which is the second priority of a job whose job ID is 5 to the target job as the first priority and the second priority, respectively (S158), and increments by 1 the second priority of a job whose second priority value is equal to or higher than 1 of the target job, out of jobs other than the target job the first priority of which is 5 same as that of the target job (S163). At the end of the above operation, the jobs included in the job list 25c are in the state illustrated in FIG. 10C.

FIG. 11A is a table illustrating an example of the jobs included in the job list 25c in a case where the unspecified job priority is 50. FIG. 11B is a table illustrating an example of the jobs included in the job list 25c in a case where a new job is added in the state illustrated in FIG. 11A.

The job list 25c does not include the information "printing order" illustrated in FIG. 11. In FIG. 11, the "printing order" is illustrated for ease of understanding.

In a case where the unspecified job priority is 50 and a job is not included in the job list 25c, when receiving a print instruction corresponding to an unspecified job, the controller 26 of the image forming apparatus 20 assigns, for example, 1 as a job ID to a target job corresponding to the received instruction (S142), and after adding the target job to the job list 25c (S143), assigns 50, which is the unspecified job priority, to the target job as the first priority (S149), and assigns 1 to the target job as the second priority (S153). Next, when receiving a print instruction corresponding to an unspecified job, the controller 26 assigns, for example, 2 as a job ID to a target job corresponding to the received instruction (S142), and after adding the target job to the job list 25c (S143), assigns 50, which is the unspecified job priority, to the target job as the first priority (S149), and assigns 2 to the target job as the second priority (S155). Next, when receiving a print instruction corresponding to an unspecified job, the controller 26 assigns, for example, 3 as a job ID to a target job corresponding to the received instruction (S142), and after adding the target job to the job list 25c (S143), assigns 50, which is the unspecified job priority, to the target job as the first priority (S149), and assigns 3 to the target job as the second priority (S155). At the end of the above operation, the jobs included in the job list 25c are in the state illustrated in FIG. 11A.

In a case where the jobs included in the job list 25c are in the state illustrated in FIG. 11A, when receiving a print instruction in the XJMF message in which 10 is included as the Priority parameter value, the controller 26 assigns, for example, 4 as a job ID to a target job corresponding to the received instruction (S142), and after adding the target job to the job list 25c (S143), assigns the Priority parameter value 10 to the target job as the first priority (S151), and assigns 1 to the target job as the second priority (S153). At the end of the above operation, the jobs included in the job list 25c are in the state illustrated in FIG. 11B.

Next, the operation of the image forming apparatus 20 when executing printing will be described.

Figure 12:
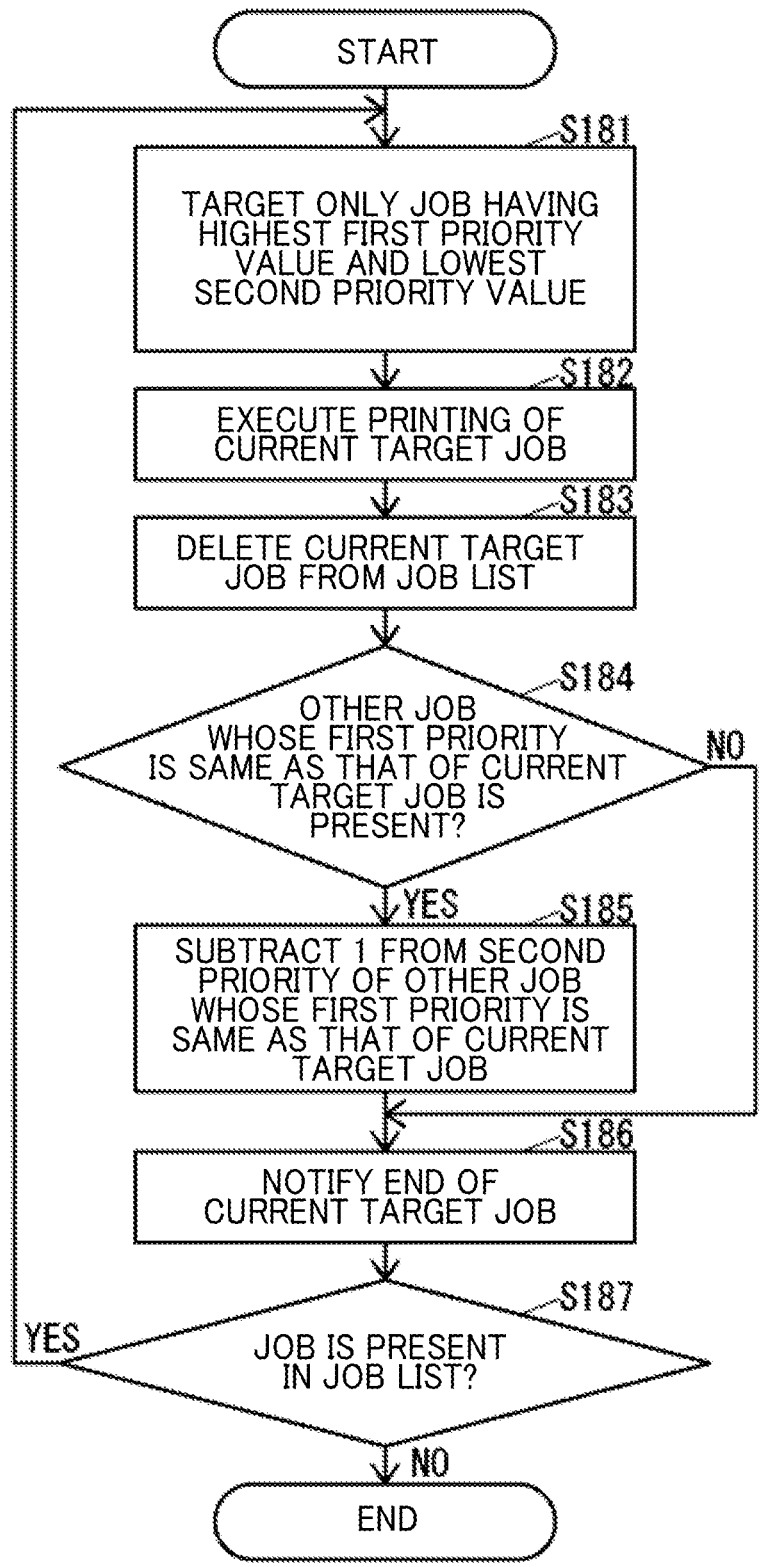
FIG. 12 is a flowchart of the operation of the image forming apparatus illustrated in FIG. 2 when executing printing.

FIG. 12 is a flowchart of the operation of the image forming apparatus 20 when executing printing.

The job executor 26h of the image forming apparatus 20 executes the operation illustrated in FIG. 12 when a job is present in the job list 25c.

As illustrated in FIG. 12, the job executor 26h targets only the jobs having the highest first priority value and the smallest second priority value among the jobs present in the job list 25c (S181).

Next, the job executor 26h executes printing of the current target job (S182). Here, the job executor 26h uses the print data associated with the current target job in S147.

After the processing of S182, the job executor 26h deletes the current target job from the job list 25c (S183).

Next, the job executor 26h determines whether a job whose first priority is same that of the current target job is present in the job list 25c other than the current target job (S184).

When determining in S184 that a job whose first priority is same as that of the current target job is present in the job list 25c other than the current target job, the job executor 26h subtracts 1 from the second priority of a job whose first priority is same as that of the current target job other than the current target job (S185).

When determining in S184 that a job whose first priority is same as that of the current target job is not present in the job list 25c other than the current target job, or when the processing of S185 ends, the job executor 26h notifies the end of printing of the current target job to the transmission source of the print instruction of the current target job (S186).

Next, the job executor 26h determines whether a job is present in the job list 25c (S187).

When determining in S187 that a job is present in the job list 25c, the job executor 26h executes the processing of S181.

When determining in S187 that a job is not present in the job list 25c, the job executor 26h ends the operation illustrated in FIG. 12.

As described above, the image forming apparatus 20 can accept a priority-specified job for which an execution priority is specified and an unspecified job for which a value that affects the order of job execution is not specified, and determines the order of execution of this priority-specified job on the basis of the priority specified in the priority-specified job (S151, S153, and S155), and determines the order of execution of the unspecified job on the basis of an unspecified job priority which is the execution priority of the unspecified job (S149, S153, and S155), and can accept the specification of the unspecified job priority (S101-S103). Thus, by specifying the execution priority of the priority-specified job to be lower than the unspecified job priority by the user, the execution order of the priority-specified job that does not need to be executed on a priority basis can be positively postponed. Therefore, the image forming apparatus 20 can execute a job in the order according to the user's preference when the priority-specified job and the unspecified job are mixed.

In the image forming apparatus 20, in a case where at least one of an existing job to be executed immediately before a job and an existing job to be executed immediately after the job is specified, the order of job execution can be specified with higher accuracy compared to a case where the execution priority of the job is specified.

The URL of the XJDF included in the XJMF message may point to a location in the client 30. Similarly, the URL of the print data included in the XJDF may point to a location in the client 30.

What is claimed is:

1. An image forming apparatus comprising:
   a job acceptor configured to accept a print job;
   an order determiner configured to determine an order of execution of the print job accepted by the job acceptor;
   a job executor configured to execute the print job accepted by the job acceptor in the order determined by the order determiner; and
   an unspecified job priority manager configured to manage a value for the order set for an unspecified job that is the print job which does not include the value for the order,
   wherein the job acceptor can accept a priority-specified job that is the print job which includes the value for the order, and the unspecified job,
   wherein the order determiner determines the order of the priority-specified job and the unspecified job on a basis of the value included in the priority-specified job and the value managed by the unspecified job priority manager, and
   wherein the unspecified job priority manager can accept the value for the order set by a user.

2. The image forming apparatus according to claim 1,
   wherein the job acceptor can accept an adjacent job-specified job that is the print job which includes, as the value for the order, at least one of an existing print job to be executed immediately before and an existing print job to be executed immediately after, and
   wherein the order determiner determines the order of the adjacent job-specified job on a basis of the order of the existing print job specified in the adjacent job-specified job.

3. A computer-readable non-temporary recording medium that stores an image forming program for causing an image forming apparatus to implement:
   a job acceptor configured to accept a print job;
   an order determiner configured to determine an order of execution of the print job accepted by the job acceptor;
   a job executor configured to execute the print job accepted by the job acceptor in the order determined by the order determiner; and
   an unspecified job priority manager configured to manage a value for the order set for an unspecified job that is the print job which does not include the value for the order, wherein the job acceptor can accept a priority-specified job that is the print job which includes the value for the order, and the unspecified job, wherein the order determiner determines the order of the priority-specified job the unspecified job on a basis of the value included in the priority-specified job and the value managed by the unspecified job priority manager, and wherein the unspecified job priority manager unit can accept the value for the order set by a user.

* * * * *